United States Patent
Krishnaswamy et al.

(10) Patent No.: US 8,186,390 B2
(45) Date of Patent: May 29, 2012

(54) WOVEN FABRIC HAVING COTTON WARP AND POLYESTER WEFT YARNS

(75) Inventors: Kalidass Krishnaswamy, Lake Forest, CA (US); Santhakumar Oliver, Rancho Santa Margarita, CA (US); Kirit Dahyabhai Patel, Coto De Caza, CA (US)

(73) Assignee: Venus Group, Inc., Foothill Ranch, CA (US)

( * ) Notice: Subject to any disclaimer, the term of this patent is extended or adjusted under 35 U.S.C. 154(b) by 195 days.

(21) Appl. No.: 12/803,877

(22) Filed: Jul. 8, 2010

(65) Prior Publication Data

US 2012/0009405 A1    Jan. 12, 2012

(51) Int. Cl.
*D03D 15/00* (2006.01)
*D03D 25/00* (2006.01)

(52) U.S. Cl. .............. 139/420 A; 139/420 R; 139/426 R

(58) Field of Classification Search ........................ None
See application file for complete search history.

(56) References Cited

U.S. PATENT DOCUMENTS

| | | | |
|---|---|---|---|
| 3,632,383 A | 1/1972 | Dominick et al. | |
| 3,694,832 A | 10/1972 | Jamison | |
| 3,721,274 A * | 3/1973 | Sherrill et al. | 139/396 |
| 4,063,885 A | 12/1977 | Mares et al. | |
| 4,191,221 A * | 3/1980 | Boyer | 139/426 R |
| 4,578,306 A * | 3/1986 | Heiman | 442/214 |
| 4,634,625 A | 1/1987 | Franklin | |
| 4,654,254 A | 3/1987 | Gerry et al. | |
| 4,670,326 A * | 6/1987 | Heiman | 442/214 |
| 4,724,183 A * | 2/1988 | Heiman | 442/214 |
| 5,364,683 A | 11/1994 | Flint et al. | |
| 5,487,936 A | 1/1996 | Collier | |
| 5,495,874 A * | 3/1996 | Heiman | 139/420 A |
| 2003/0194938 A1 * | 10/2003 | Efird et al. | 442/334 |
| 2004/0055660 A1 | 3/2004 | Heiman | |
| 2006/0180229 A1 | 8/2006 | Heiman | |
| 2007/0014967 A1 * | 1/2007 | Tingle et al. | 428/96 |
| 2008/0057813 A1 * | 3/2008 | Tingle et al. | 442/203 |
| 2008/0096001 A1 * | 4/2008 | Emden et al. | 428/222 |
| 2010/0015874 A1 * | 1/2010 | Tingle et al. | 442/187 |

OTHER PUBLICATIONS

Tomasino, Charles and Wilson, Thomas W., "Urethane Prepolymers as Durable Press Finishes." American Chemical Society. 1982. vol. 21, pp. 4-11. Ind.Eng.Chem.Prod.Res.Dev.

Musshoff, H. "Dyeing and Printing Polyester and Polyester-Cellulosic Fabrics with Polyestren Dyes." The Journal of the Society of Dyers and Colourists. Mar. 1961.vol. 77,3, 89-96.

* cited by examiner

*Primary Examiner* — Bobby Muromoto, Jr.
(74) *Attorney, Agent, or Firm* — Timothy J. Monahan; Monahan & Moses, LLC

(57) ABSTRACT

A woven textile fabric for use as a bed sheet is provided having spun cotton warp yarns and continuous multi-filament weft yarns, to provide a total yarn count of from 170 to 215, and wherein the construction of the fabric balances the tensile strength of the fabric in the warp and weft direction, to provide a tensile strength in one direction of the fabric that is at least 80% of the tensile strength in the cross direction.

19 Claims, No Drawings

WOVEN FABRIC HAVING COTTON WARP AND POLYESTER WEFT YARNS

This invention relates generally to a woven fabric useful for bed sheets, and particularly to a woven fabric having spun cotton warp yarns and textured polyester filament weft yarns. The sheeting fabric is constructed for commercial use, such as by institutions, hospitals, hotels and the like, and is capable of withstanding multiple washings under industrial laundry conditions.

BACKGROUND OF THE INVENTION

Sheets made of 100% cotton are generally regarded as providing the greatest comfort and absorbency. Nevertheless, the durability of the sheet is an important consideration, especially in regard to commercial applications, where the sheet may be subjected to high temperatures and harsh chemicals during laundering and ironing. For example, the life cycle of a 100% cotton sheet is approximately 50 to 60 industrial launderings and ironings. Since many applications require that the sheets be changed every day, such as in hospitals and hotels, the replacement cost of sheets is a significant expense.

One solution has been to replace cotton fiber with polyester fiber in sheeting fabric. While the use of polyester fiber significantly increases the durability of the sheet, the comfort level of the sheet in terms of hand and absorbency suffers.

Heiman, U.S. Pat. No. 5,495,874 discloses a woven fabric useful for sheeting having cotton warp yarns and continuous filament, textured, polyester filling (weft) yarns. The product has a warp-to-fill ratio of from 1.6:1 to 2.2:1. Despite having a relatively high warp-to-fill yarn ratio, the fabric is substantially weaker in the warp direction than the filling direction, with reported tensile strength values of 57.4 lbs. and 99.0 lbs., respectively. The relatively low tensile strength in the warp direction represents a "weak link" in the fabric construction, and likely point of failure during the life cycle of a sheet made from the fabric.

There remains a need in the industry for a sheeting fabric having the comfort of cotton fiber and the strength and durability of polyester fiber. Further, there is a need for a sheeting fabric having a relatively high tensile strength in both the warp and filling direction. Still further, there is a need for a sheeting fabric having a tensile strength in the warp and filling direction that is balanced, to avoid over-engineering the fabric in one direction, at the expense of the tensile strength in the cross direction.

SUMMARY OF THE INVENTION

Accordingly, a woven textile fabric is provided having cotton yarn in the warp direction and polyester, multifilament yarn in the weft (filling or fill) direction. The number of warp yarns may range from 90 to 120 ends per inch (ends per inch or "epi"), and the number of weft yarns may range from 65 to 95 per inch (picks per inch or "ppi"). The total thread count (ends per inch+picks per inch) may range from 170 to 215. The warp-to-fill ratio may range from 1.1:1 to 1.5:1.

The cotton warp yarn is selected to provide a minimum tensile strength in the warp direction of 75 lbs. By way of example, the cotton warp yarns may be ring spun yarns. Cotton yarns having a yarn count of from 20 to 40 are useful in the present invention (reported as English Yarn Count "ECC" or "Ne").

The polyester weft yarn is selected to provide a minimum tensile strength in the weft direction of 75 lbs. The polyester yarn is a multifilament yarn that is, made of multiple, continuous filaments of polyester. By way of example, each polyester yarn may contain from 60 to 130 individual filaments. Polyester yarns having a denier of from 75 to 150, in particular from 85 to 120 denier, are useful in the present invention.

The sheeting fabric of the present invention may range in weight from 3.5 to 4.4 oz. per square yard. The aesthetics and absorbency of the fabric are enhanced by providing a fabric having a minimum cotton content of 60% by weight, in particular, a minimum cotton content of 67.5% by weight.

DETAILED DESCRIPTION OF THE INVENTION

Without intending to limit the scope of the invention, the preferred embodiments and features are hereinafter set forth. All of the United States patents cited herein are incorporated by reference.

The fabric of the subject invention is woven. By way of example, the fabric may be a plain, twill or satin weave or combinations thereof. In one embodiment, the fabric is a plain weave with twill stripes.

The warp yarns are made of spun, cotton staple fibers. Minor amounts of other staple fibers may be present in the warp yarns. For example, 10% by weight or less, in particular 5% by weight or less, of the warp yarns may comprise non-cotton staple fibers, without deviating from the objectives of the invention, that is, to provide a fabric having the hand and absorbency characteristic of cotton. In one embodiment of the invention, the warp yarns are 100% cotton fiber. Ring spun yarns have been found to be advantageous in improving the strength of the fabric in the warp direction.

The weft yarns are multifilament polyester and may be single or multi-ply yarns. By way of example, the polyester may be polyethylene terephthalate (PET). Other examples of suitable polyester polymers for use in fiber production may be found in U.S. Pat. No. 6,395,386 B2. The weft yarns are preferably textured, for example, to provide surface texture, bulk, stretch and warmth. Texturing may be accomplished by any of various methods, such as are known to those skilled in the art. In one embodiment of the invention, the weft yarns are 100% polyester fiber.

The fabric is constructed having from 90 to 120 ends per inch, in particular from 95 to 115 ends per inch of the cotton warp yarn, and from 65 to 95 picks per inch, in particular from 70 to 90 picks per inch of the multifilament polyester yarn. The total thread count may range from 170 to 215, in particular, from 170 to 200. The warp-to-fill ratio may range from 1.1:1 to 1.5:1, in particular from 1.2:1 to 1.4:1. In one embodiment of the invention, the fabric is constructed having from 100 to 110 ends per inch and from 75 to 85 picks per inch.

The subject fabric has a minimum tensile strength in the warp direction of 75 lbs., preferably a minimum of 85 lbs., and a minimum tensile strength in the weft direction of 75 lbs., preferably a minimum of 85 lbs. In one embodiment of the invention, the fabric is constructed to balance the tensile strength in the warp and weft direction. Accordingly, the tensile strength in any direction may be at least 80%, in particular at least 90%, of the tensile strength in the cross direction. For example, the tensile strength of the fabric in the warp direction is at least 80% of the tensile strength of the fabric in the weft direction.

The fabric has a minimum tear strength in the warp direction of 4 lbs., in particular 5 lbs, and a minimum tear strength in the weft direction of 4 lbs, in particular 5 lbs.

Tensile strength was determined according to ASTM D5034 Standard Test Method for Breaking Strength and Elongation of Textile Fabrics (Grab Test) and tear strength was determined according to ASTM D1424 Standard Test Method for Tearing Strength of Fabrics.

The term "industrial launderings and ironings" means laundering, extracting and ironing the subject woven textile fabric according to the protocol set forth in Example 2, below.

Example 1

Fabric Construction and Performance

A sheeting fabric was constructed according to the present invention having a plain weave with twill weave stripes of approximately 8 mm in width. The fabric had the following parameters:

| | |
|---|---|
| Warp Yarn: | 105 epi of 100% cotton ring spun yarn, 31s Ne; |
| Weft Yarn: | 80 ppi of 100% polyester multifilament, textured yarn, 98d/108 filaments; |
| Weight of the fabric | 3.63 oz/yd$^2$ |
| Warp to Fill Ratio | 1.31 |
| Total thread count | 185 |

The fabric was tested and found to have the following performance characteristics:

Tensile strength (warp): 95.2 lbs.
Tensile strength (weft): 102.0 lbs.
Tear strength (warp): 6.2 lbs.
Tear strength (weft): 6.4 lbs.

Example 2

Durability Test

The sheeting fabric of Example 1 was subjected to 80 cycles of industrial washing and ironing, to verify the durability of the fabric. The washing, extracting and ironing procedure is as follows:

The test sheets were washed and extracted in an ELLIS™ washer/extractor with 900 lbs. of capacity. The total wash time was 46 minutes, which included 8 minutes of extraction time at 600 rpm. No dryer or drying time was used in the process; the extraction at the end of the wash process is sufficient to remove sufficient moisture prior to ironing the sheets. Following washing and extraction, the sheets were ironed using an industrial ironer. The ironing temperature was from 320° F. to 380° F.

Each 900 pound load was washed in an aqueous composition containing:

| | |
|---|---|
| Notice ™ | 4 lbs. (Alkali, detergent & builder) |
| Bleach | 4 gallons of 2% solution |
| Antichlor | 6 ounces |
| Sour | 12 ounces |

The wash chemicals were obtained from Washing Systems International (WSI) Cincinnati, Ohio. The highest temperature used in the wash process was 150° F.

After 80 cycles, the sheets were visually examined for deterioration, such as holes or tears in the fabric. No visible signs of deterioration were observed. The sheets were subjected to physical testing. The results are shown below in Table 1.

TABLE 1

| Physical Testing | Sheet of Example 1 Before washing/ironing | Sheet of Example 1 After washing/ironing (80 cycles) |
|---|---|---|
| Tensile strength (warp) | 95 lbs. | 80.4 lbs. |
| Tensile strength (weft) | 102 lbs. | 97.5 lbs. |
| Tear strength (warp) | 6.2 lbs. | 2.9 lbs. |
| Tear strength (weft) | 6.4 lbs. | 3.1 lbs. |

The results of 80 cycles in an industrial laundry demonstrate the exceptional durability of the fabric of the subject invention. The tensile strength in the warp direction remains relatively high and is 82.5% of the tensile strength in the weft direction. In one embodiment of the invention, the tensile strength in any direction is at least 80% of the tensile strength in the cross direction, after 80 industrial launderings and ironings. Preferably, the fabric has minimum tensile strengths in the warp and fill direction of 75 lbs. after 80 industrial launderings and ironings.

The invention may be further understood by reference to the following claims.

What we claim is:

1. A woven textile fabric comprising:
   (a) from 90 to 120 ends per inch of cotton staple yarns;
   (b) from 65 to 95 picks per inch of continuous, multifilament polyester yarns;
   (c) wherein the warp to fill ratio is from 1.1:1 to 1.5:1; and
   (d) wherein the fabric has a minimum tensile strength in the warp and weft directions of 75 lbs, after 80 industrial washings and ironings.

2. The fabric of claim 1, wherein the tensile strength in one direction of the fabric is at least 80% of the tensile strength in the cross direction.

3. The fabric of claim 1, wherein the total thread count is from 170 to 215.

4. The fabric of claim 1, wherein the warp yarns are 100% cotton and have a yarn count of from 20 to 40.

5. The fabric of claim 1, wherein the polyester yarns have a denier of from 75 to 150.

6. The fabric of claim 1, wherein the fabric weight is from 3.5 to 4.4 oz/yd$^2$.

7. The fabric of claim 1, wherein the tensile strength in one direction of the fabric is at least 80% of the tensile strength in the cross direction, after 80 industrial washings and ironings.

8. A woven textile fabric comprising:
   (a) from 95 to 115 ends per inch of cotton staple yarns;
   (b) from 70 to 90 picks per inch of continuous, multifilament polyester yarns;
   (c) wherein the warp to fill ratio is from 1.1:1 to 1.5:1;
   (d) wherein the total thread count is from 170 to 200;
   (e) wherein the fabric has a minimum tensile strength in the warp and weft directions of 75 lbs; and
   (f) wherein the tensile strength in one direction of the fabric is at least 80% of the tensile strength in the cross direction.

9. The fabric of claim 8, wherein the fabric has a minimum tear strength in the warp and weft directions of 4 lbs.

10. The fabric of claim 8, wherein the fabric has a minimum tensile strength in the warp and weft directions of 75 lbs, after 80 industrial washings and ironings.

11. The fabric of claim 8, wherein the tensile strength in one direction of the fabric is at least 80% of the tensile strength in the cross direction, after 80 industrial washings and ironings.

12. The fabric of claim 8, wherein the warp yarns are 100% cotton and have a yarn count of from 20 to 40, and wherein the polyester yarns have a denier of from 85 to 120.

13. A woven textile fabric comprising:
    (a) from 100 to 110 ends per inch of cotton staple yarns;
    (b) from 75 to 85 picks per inch of continuous, multi-filament polyester yarns;
    (c) wherein the warp to fill ratio is from 1.2:1 to 1.4:1;
    (d) wherein the total thread count is from 170 to 200;
    (e) wherein the fabric has a minimum tensile strength in the warp and weft directions of 75 lbs.;
    (f) wherein the fabric has a minimum tear strength in the warp and weft directions of 4 lbs.; and
    (g) wherein the tensile strength in one direction of the fabric is at least 80% of the tensile strength in the cross direction.

14. The fabric of claim 13, wherein the fabric has a minimum cotton content of 60% by weight.

15. The fabric of claim 14, wherein the tensile strength in one direction of the fabric is at least 90% of the tensile strength in the cross direction.

16. The fabric of claim 13, wherein the fabric has a minimum tensile strength in the warp and weft directions of 75 lbs, after 80 industrial washings and ironings.

17. The fabric of claim 16, wherein the tensile strength in one direction of the fabric is at least 80% of the tensile strength in the cross direction, after 80 industrial washings and ironings.

18. The fabric of claim 13, wherein the fabric has a weight of from 3.5 to 4.4 oz/yd$^2$, a minimum tensile strength in the warp and weft directions of 85 lbs., and a minimum tear strength in the warp and weft directions of 5 lbs.

19. The fabric of claim 18, wherein the fabric has a minimum cotton content of 67.5% by weight.

* * * * *

(12) EX PARTE REEXAMINATION CERTIFICATE (10721st)
United States Patent
Krishnaswamy et al.

(10) Number: US 8,186,390 C1
(45) Certificate Issued: Sep. 28, 2015

(54) WOVEN FABRIC HAVING COTTON WARP AND POLYESTER WEFT YARNS

(75) Inventors: Kalidass Krishnaswamy, Lake Forest, CA (US); Santhakumar Oliver, Rancho Santa Margarita, CA (US); Kirit Dahyabhai Patel, Coto De Caza, CA (US)

(73) Assignee: VENUS GROUP, INC., Foothill Ranch, CA (US)

Reexamination Request:
No. 90/013,441, Feb. 6, 2015

Reexamination Certificate for:
Patent No.: 8,186,390
Issued: May 29, 2012
Appl. No.: 12/803,877
Filed: Jul. 8, 2010

(51) Int. Cl.
*D03D 15/00* (2006.01)
*D03D 25/00* (2006.01)

(52) U.S. Cl.
CPC ............... *D03D 15/00* (2013.01); *D03D 25/00* (2013.01)

(58) Field of Classification Search
None
See application file for complete search history.

(56) References Cited

To view the complete listing of prior art documents cited during the proceeding for Reexamination Control Number 90/013,441, please refer to the USPTO's public Patent Application Information Retrieval (PAIR) system under the Display References tab.

*Primary Examiner* — Catherine S Williams

(57) ABSTRACT

A woven textile fabric for use as a bed sheet is provided having spun cotton warp yarns and continuous multi-filament weft yarns, to provide a total yarn count of from 170 to 215, and wherein the construction of the fabric balances the tensile strength of the fabric in the warp and weft direction, to provide a tensile strength in one direction of the fabric that is at least 80% of the tensile strength in the cross direction.

**EX PARTE
REEXAMINATION CERTIFICATE**

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13-19 is confirmed.

Claims 1 and 8-9 are determined to be patentable as amended.

Claims 2-7 and 10-12, dependent on an amended claim, are determined to be patentable.

1. A woven textile fabric comprising:
   (a) from 90 to 120 ends per inch of cotton staple yarns;
   (b) from 65 to 95 picks per inch of continuous, multi-filament polyester yarns;
   (c) wherein the warp to fill ratio is from 1.1:1 to 1.5:1; [and]
   (d) wherein the fabric has a minimum tensile strength in the warp and weft directions of 75 lbs. after 80 industrial washings and ironings, *and*
   (e) *the fabric has minimum tear strength in the warp and weft direction of 4 lbs.*

8. A woven textile fabric comprising:
   (a) from 95 to 115 ends per inch of cotton staple yarns;
   (b) from 70 to 90 picks per inch of continuous, multi-filament, polyester yarns;
   (c) wherein the warp to fill ratio is from 1.1:1 to 1.5:1;
   (d) wherein the total thread count is from 170 to 200;
   (e) wherein the fabric has a minimum tensile strength in the warp and weft directions of 75 lbs; [and]
   (f) wherein the tensile strength in one direction of the fabric is at least 80% of the tensile strength in the cross direction, *and*
   (g) *the fabric has minimum tear strength in the warp and weft direction of 4 lbs.*

9. The fabric of claim 8, wherein the fabric has a minimum tear strength in the warp and well directions of [4] *5* lbs.

\* \* \* \* \*